(12) United States Patent
Almotlaq et al.

(10) Patent No.: US 10,022,646 B1
(45) Date of Patent: Jul. 17, 2018

(54) SOLAR COOLING AND WATER SALINATION SYSTEM

(71) Applicants: KING SAUD UNIVERSITY, Riyadh (SA); QUDRA ENERGY COMPANY, Riyadh (SA)

(72) Inventors: Yousef Abdullah Almotlaq, Riyadh (SA); Mazen Abdullah Baabbad, Riyadh (SA); Hany Abdulrahman Alansary, Riyadh (SA); Essam Abdulaziz Al Ammar, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/785,238

(22) Filed: Oct. 16, 2017

(51) Int. Cl.
| | |
|---|---|
| C02F 1/04 | (2006.01) |
| B01D 1/00 | (2006.01) |
| B01D 3/02 | (2006.01) |
| B01D 5/00 | (2006.01) |
| C02F 1/16 | (2006.01) |
| C02F 1/14 | (2006.01) |
| B01D 1/28 | (2006.01) |

(52) U.S. Cl.
CPC ......... *B01D 1/0058* (2013.01); *B01D 1/0035* (2013.01); *B01D 1/0041* (2013.01); *B01D 1/28* (2013.01); *B01D 3/02* (2013.01); *B01D 5/006* (2013.01); *C02F 1/041* (2013.01); *C02F 1/048* (2013.01); *C02F 1/14* (2013.01); *C02F 1/16* (2013.01)

(58) Field of Classification Search
CPC .. C02F 1/041; C02F 1/048; C02F 1/14; C02F 1/16; B01D 1/0035; B01D 1/0041; B01D 1/0058; B01D 1/28; B01D 3/02
See application file for complete search history.

(56) References Cited

U.S. PATENT DOCUMENTS

| | | | | |
|---|---|---|---|---|
| 4,985,122 A | * | 1/1991 | Spencer | B01D 1/02 203/11 |
| 6,402,897 B1 | | 6/2002 | Gunn | |
| 7,228,682 B2 | * | 6/2007 | Kashler | B01D 1/26 60/39.182 |

(Continued)

FOREIGN PATENT DOCUMENTS

EP 2369266 9/2011

OTHER PUBLICATIONS

A. Williams, "Solar Powered Water Desalination Heats Up in Chile", vol. 28, Iss. 3 (2013) (9 pages).

*Primary Examiner* — Jonathan Miller
(74) *Attorney, Agent, or Firm* — Richard C. Litman

(57) ABSTRACT

The solar cooling and water desalination system is a roof-mounted system having a refrigeration unit driven by electricity produced by solar panels to chill water, which is stored in a first tank and used to cool living spaces. Seawater is preheated in a first heat exchanger by waste heat from operation of the refrigeration unit, and heated further in a second heat exchanger by hot distilled water. A field of solar collectors heats oil, which is stored in a hot oil tank and then powers a first boiler to produce high pressure and temperature steam for a steam ejector vacuum system connected to a desalination water boiler that desalinates the seawater, which is condensed by a condenser and stored in a distilled water tank, where it is stored at about 80° C.

13 Claims, 1 Drawing Sheet

(56) References Cited

U.S. PATENT DOCUMENTS

| | | | | |
|---|---|---|---|---|
| 8,776,522 B2* | 7/2014 | Schubert | ................ | C02F 1/048 |
| | | | | 60/641.9 |
| 9,644,500 B2* | 5/2017 | Mu | ..................... | B01D 1/0058 |
| 9,816,400 B1* | 11/2017 | Phelps, Sr. | ............. | F01K 17/04 |
| 2011/0277471 A1 | 11/2011 | Shinnar | | |
| 2015/0128622 A1* | 5/2015 | Filippone | .................. | F01N 5/02 |
| | | | | 62/79 |
| 2016/0115945 A1 | 4/2016 | Barsi et al. | | |
| 2016/0194217 A1* | 7/2016 | Al-Ghizzy | ................ | C02F 1/16 |
| | | | | 203/10 |
| 2016/0229706 A1* | 8/2016 | Ackerman | ........... | B01D 1/0017 |
| 2016/0252279 A1* | 9/2016 | Hui | ....................... | B01D 3/007 |
| | | | | 62/112 |

* cited by examiner

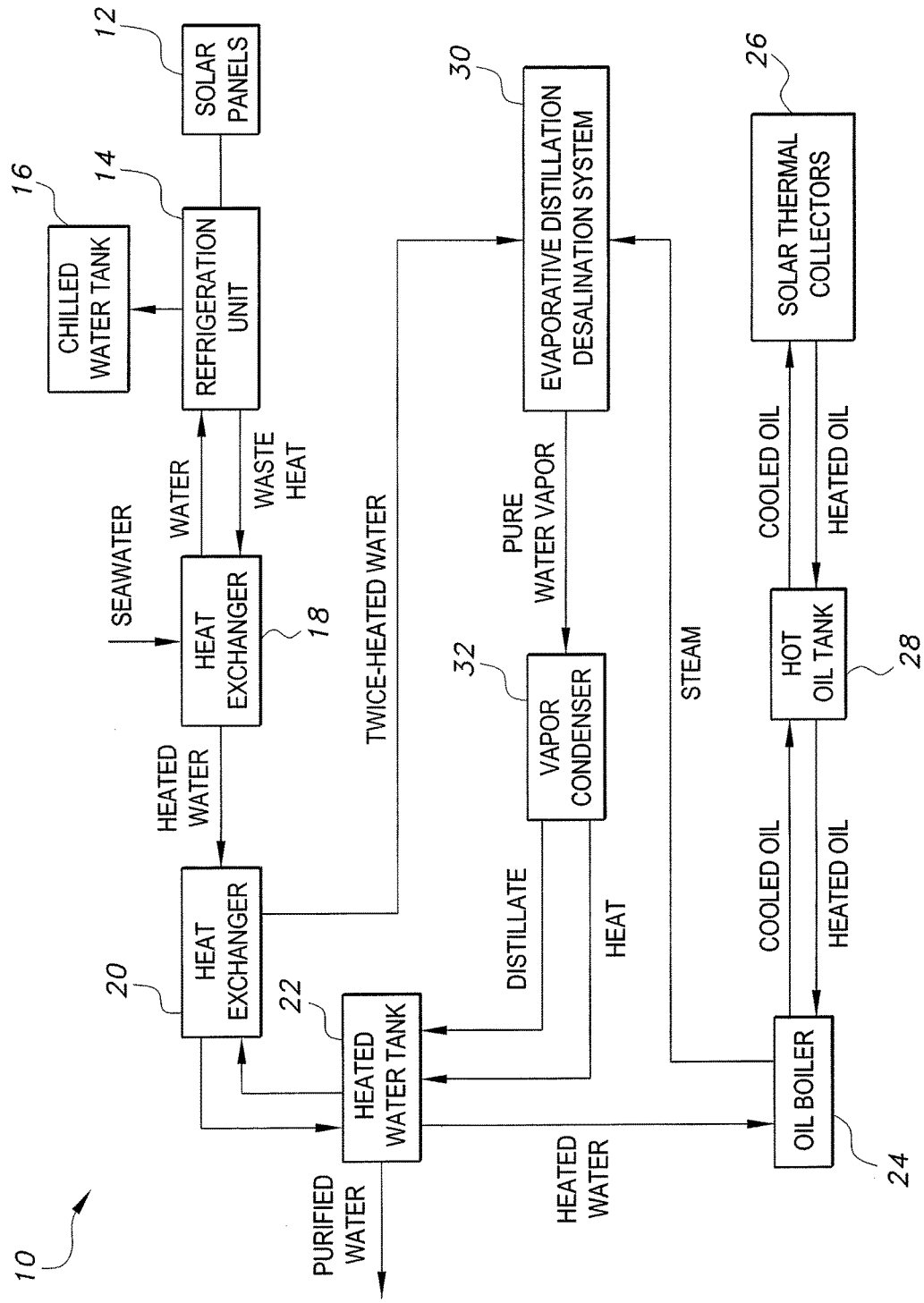

US 10,022,646 B1

SOLAR COOLING AND WATER SALINATION SYSTEM

BACKGROUND OF THE INVENTION

1. Field of the Invention

The disclosure of the present patent application relates to water purification, and particularly to a solar cooling and water desalination system that includes three tanks for thermal storage.

2. Description of the Related Art

In arid regions of the world, such as the Middle East, there is a constant and growing need for fresh water and for cooling of living spaces. Fossil fuel systems to power desalination plants and to power air conditioning systems are expensive. Solar energy systems are becoming more affordable and are generally less expensive than fossil fuel-based systems, but the intermittent nature of solar energy renders solar energy systems less attractive for operation of cooling systems and water desalination systems.

Thus, a solar cooling and water desalination system solving the aforementioned problems is desired.

SUMMARY OF THE INVENTION

The solar cooling and water desalination system is a roof-mounted system having a refrigeration unit driven by electricity produced by solar panels to chill water, which is stored in a first tank and used to cool living spaces. Seawater is preheated in a first heat exchanger by waste heat from operation of the refrigeration unit, and heated further in a second heat exchanger by hot distilled water. A field of solar collectors heats oil, which is stored in a hot oil tank and then powers a first boiler to produce high pressure and temperature steam for a steam ejector vacuum system connected to a desalination water boiler that desalinates the seawater, which is condensed by a condenser and stored in a distilled water tank, where it is stored at about 80° C.

These and other features of the present disclosure will become readily apparent upon further review of the following specification and drawing.

BRIEF DESCRIPTION OF THE DRAWINGS

The sole drawing FIGURE is a block diagram of a solar cooling and water desalination system.

DETAILED DESCRIPTION OF THE PREFERRED EMBODIMENTS

The solar cooling and water desalination system 10 utilizes both solar thermal collectors and photovoltaic panels to provide power for an evaporative distillation desalination system. As shown in the sole drawing FIGURE, a first heat exchanger 18 initially receives water to be purified, such as brine, wastewater, seawater or the like. In the following, seawater will be used as an example of the "raw" water which is to be purified, although it should be understood that the solar desalination plant 10 may be used to purify water from any suitable water source. It should be understood that any suitable type of pump or the like may be used for feeding the initial volume of seawater into first heat exchanger 18.

A refrigeration unit 14 is in fluid communication with the first heat exchanger 18 for receiving and cooling a first portion of the seawater. The cooled seawater may be stored in a chilled water tank 16 for chilled water applications, such as space cooling. Preferably, the refrigeration unit 14 is powered by at least one photovoltaic panel 12 in electrical communication therewith. It should be understood that any suitable type of photovoltaic panel may be used, such as typical, roof-mounted solar panels or the like. It should be additionally understood that the refrigeration unit 14 may be powered by a conventional electrical source, such as the electrical power grid, as needed. For example, at night, when solar power is not available, the refrigeration unit 14 could be switched to the conventional electrical power supply. It should be further understood that any suitable type of pump or the like may be used for transferring the first portion of the seawater to refrigeration unit 14.

The refrigeration unit 14 is also in thermal communication with the first heat exchanger 18, such that the first heat exchanger 18 receives thermal energy, in the form of waste heat, from the refrigeration unit 14. This waste heat is used for heating a second portion of the seawater. In typical operation, the first heat exchanger 18 heats the second portion of the seawater to a temperature of about 50° C. A second heat exchanger 20 is in fluid communication with the first heat exchanger 18 for receiving this heated second portion of the seawater. It should be understood that any suitable type of pump or the like may be used for transferring the heated second portion of the seawater from first heat exchanger 18 to second heat exchanger 20.

A heated water tank 22 is in fluid communication with the second heat exchanger 20, such that a first portion of heated water transferred from the heated water tank 22 to the second heat exchanger 20 further heats the heated second portion of the seawater to produce a twice-heated volume of seawater. In typical operation, the twice-heated volume of seawater is heated by the second heat exchanger 20 to a temperature of about 70° C. As will be described in greater detail below, the now twice-heated seawater is the water which will be distilled into potable water. It should be understood that any suitable type of pump or the like may be used for feeding the first portion of heated water into second heat exchanger 20, and for transferring this volume of water, following heat exchange, back to the heated water tank 22.

At least one solar thermal collector 26 is provided for receiving and heating a heat exchange fluid, such as oil or the like. In the following, oil is used as an example of the heat exchange fluid, although it should be understood that any suitable type of heat exchange fluid may be utilized. Additionally, it should be understood that any suitable type of solar thermal collectors may be used for heating the heat exchange fluid, such as conventional "fields" of flat plate collectors, evacuated tube collectors, bowl collectors, mirrors, or the like, as are well-known in the field of solar collectors and concentrators. The solar thermal collectors 26, in typical operation, heat the heat exchange fluid to temperatures greater than 170° C., thus the particular solar thermal collectors and the heat exchange fluid used should be selected to accommodate temperatures in this range.

A hot oil tank 28 provides the oil to the at least one solar thermal collector 26 and receives the heated oil therefrom. It should be understood that any suitable type of pump or the like may be used to circulate the oil through the hot oil tank 28 and the at least one solar thermal collector 26. An oil boiler 24 is in fluid communication with the hot oil tank 28 for receiving the heated oil. The boiler 28 is also in fluid communication with the heated water tank 22 for receiving a second portion of the heated water therefrom. The oil boiler 24 uses the heat from the heated oil to boil the second portion of the heated water to produce steam. Since the heated oil, as described above, typically has a temperature greater than 170° C., the steam produced by oil boiler 24 is both high pressure and high temperature steam. The cooled oil, following heat transfer to the steam, is returned to the hot oil tank 28 so that it can be re-heated by the at least one solar thermal collector 26. It should be understood that any suitable type of pump or the like may be used to circulate the oil through the hot oil tank 28 and the oil boiler 24.

An evaporative distillation desalination system 30 is in fluid communication with the second heat exchanger 20 for receiving the twice-heated volume of seawater. It should be understood that any suitable type of pump or the like may be used to transfer the twice-heated volume of seawater from second heat exchanger 20 to evaporative distillation desalination system 30. The evaporative distillation desalination system is also in fluid communication with the oil boiler 24 for receiving the steam therefrom. Thermal energy transferred from the steam is used to evaporate the twice-heated volume of seawater to produce pure water vapor.

It should be understood that any suitable type of evaporative distillation system may be used to distill the twice-heated volume of seawater into pure water vapor, via evaporation, as is well known in the art. Preferably, the evaporative distillation desalination system 30 is a vapor compression evaporation system. In such systems, compression is performed by a high pressure motive steam ejector. As is well-known in the art, this process, often referred to as "thermos-compression" or "steam compression", requires the use of a steam ejector. Such systems are well-known in the art. Examples of such vapor compression evaporation systems using steam ejectors are shown in U.S. Patent Application Publication No. US 2002/0119051 A1; U.S. Patent Application Publication No. US 2013/0213450 A1; and U.S. Patent Application Publication No. US 2014/0290247 A1, each of which is hereby incorporated by reference in its entirety. The selection of a vapor compression evaporation system using a steam ejector allows for evaporation of the twice-heated water at temperatures lower than 100° C.

A vapor condenser 32 receives the pure water vapor from the evaporative distillation desalination system 30 to condense the pure water vapor into a pure water distillate. As noted above, when a vapor compression evaporation system using a steam ejector is used, the pure water vapor typically has a temperature lower than 100° C. During condensation, the temperature of the product distillate is even lower. It should be understood that any suitable type of vapor condenser may be utilized to condense the pure water vapor into pure liquid water. The vapor condenser 32 is also in fluid communication with the heated water tank 22 such that the pure water distillate forms the first and second portions of the heated water. The waste heat generated by the vapor condenser 32 is used to heat the water in the heated water tank 22. Thus, the heated water contained in the heated water tank 22, which is used by the second heat exchanger 20 and also provides the water source for steam production in the oil boiler 24, is also the potable, distilled product, and may be extracted from the heated water tank 22 for drinking or other uses. It should be understood that any suitable type of pump or the like may be used to transfer the heated distillate from vapor condenser 32 to heated water tank 22.

It is to be understood that the solar cooling and water desalination system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A solar cooling and water desalination system, comprising:
   a first heat exchanger adapted for receiving seawater;
   an electrically powered refrigeration unit in fluid communication with the first heat exchanger for receiving and cooling a first portion of the seawater, the refrigeration unit being in thermal communication with the first heat exchanger so that the first heat exchanger receives waste heat from the refrigeration unit for heating a second portion of the seawater;
   a second heat exchanger in fluid communication with the first heat exchanger for receiving the heated second portion of the seawater;
   a heated water tank in fluid communication with the second heat exchanger so that a first portion of heated water transferred from the heated water tank to the second heat exchanger further heats the heated second portion of the seawater to produce a twice-heated volume of seawater;
   at least one solar thermal collector for receiving and heating a heat exchange fluid;
   a boiler in fluid communication with the at least one solar thermal collector for receiving the heated heat exchange fluid, the boiler being in fluid communication with the heated water tank for receiving a second portion of the heated water therefrom, the boiler being adapted for boiling the second portion of the heated water to produce steam;
   an evaporative distillation desalination system in fluid communication with the second heat exchanger for receiving the twice-heated volume of seawater, the evaporative distillation desalination system further being in fluid communication with the boiler for receiving the steam therefrom, so that thermal energy transferred from the steam is used to evaporate the twice-heated volume of seawater to produce desalinated water vapor;
   a vapor condenser in fluid communication with the evaporative distillation desalination system for condensing the desalinated water vapor into distilled water, the vapor condenser being in fluid communication with the heated water tank so that that the distilled water forms the first and second portions of the heated water.

2. The solar cooling and water desalination system as recited in claim 1, further comprising a cool water tank in fluid communication with said refrigeration unit for receiving and storing the cooled first portion of the seawater for space cooling.

3. The solar cooling and water desalination system as recited in claim 1, further comprising at least one solar panel electrically coupled to said refrigeration unit for providing electrical power thereto.

4. The solar cooling and water desalination system as recited in claim 1, further comprising a heat exchange fluid tank in fluid communication with the at least one solar thermal collector and said boiler.

5. The solar cooling and water desalination system as recited in claim 1, wherein said evaporative distillation desalination system comprises a vapor compression evaporation system.

6. The solar cooling and water desalination system as recited in claim 1, wherein said vapor condenser is in thermal communication with said heated water tank for heating the first and second portions of the heated water.

7. A solar cooling and water desalination system, comprising:
- a first heat exchanger adapted for receiving seawater;
- an electrically powered refrigeration unit in fluid communication with the first heat exchanger for receiving and cooling a first portion of the seawater, the refrigeration unit being in thermal communication with the first heat exchanger so that the first heat exchanger receives waste heat from the refrigeration unit for heating a second portion of the seawater;
- a second heat exchanger in fluid communication with the first heat exchanger for receiving the heated second portion of the seawater;
- a heated water tank in fluid communication with the second heat exchanger so that a first portion of heated water transferred from the heated water tank to the second heat exchanger further heats the heated second portion of the seawater to produce a twice-heated volume of seawater;
- a heater for receiving and heating a heat exchange fluid;
- a boiler in fluid communication with the heater for receiving the heated heat exchange fluid, the boiler being in fluid communication with the heated water tank for receiving a second portion of the heated water therefrom, the boiler being adapted for boiling the second portion of the heated water to produce steam;
- an evaporative distillation desalination system in fluid communication with the second heat exchanger for receiving the twice-heated volume of seawater, the evaporative distillation desalination system further being in fluid communication with the boiler for receiving the steam therefrom, so that thermal energy transferred from the steam is used to evaporate the twice-heated volume of seawater to produce desalinated water vapor;
- a vapor condenser in fluid communication with the evaporative distillation desalination system for condensing the desalinated water vapor into distilled water, the vapor condenser being in fluid communication with the heated water tank so that that the distilled water forms the first and second portions of the heated water.

8. The solar cooling and water desalination system as recited in claim 7, further comprising a cool water tank in fluid communication with said refrigeration unit for receiving and storing the cooled first portion of the seawater.

9. The solar cooling and water desalination system as recited in claim 7, further comprising at least one solar panel electrically coupled to said refrigeration unit for providing electrical power thereto.

10. The solar cooling and water desalination system as recited in claim 7, further comprising a heat exchange fluid tank in fluid communication with said heater and said boiler.

11. The solar cooling and water desalination system as recited in claim 7, wherein said evaporative distillation desalination system comprises a vapor compression evaporation system.

12. The solar cooling and water desalination system as recited in claim 7, wherein said vapor condenser is in thermal communication with said heated water tank for heating the first and second portions of the heated water.

13. The solar cooling and water desalination system as recited in claim wherein said heater comprises at least one solar thermal collector.

\* \* \* \* \*